(No Model.)

W. McCOY & J. McARTHUR.
FENDER.

No. 373,673. Patented Nov. 22, 1887.

WITNESSES:
Fred G. Dieterich
P. B. Turpin

INVENTOR:
W. McCoy
J. McArthur
BY Munn & Co.
ATTORNEYS.

United States Patent Office.

WALTER McCOY AND JAMES McARTHUR, OF MILTONVALE, KANSAS.

FENDER.

SPECIFICATION forming part of Letters Patent No. 373,673, dated November 22, 1887.

Application filed June 20, 1887. Serial No. 241,910. (No model.)

*To all whom it may concern:*

Be it known that we, WALTER McCOY and JAMES McARTHUR, of Miltonvale, in the county of Cloud and State of Kansas, have invented a new and useful Improvement in Fenders, of which the following is a specification.

This invention is an improved fender for corn; and it consists in certain improved constructions and combinations of parts, as will be described and claimed.

Figure 1:
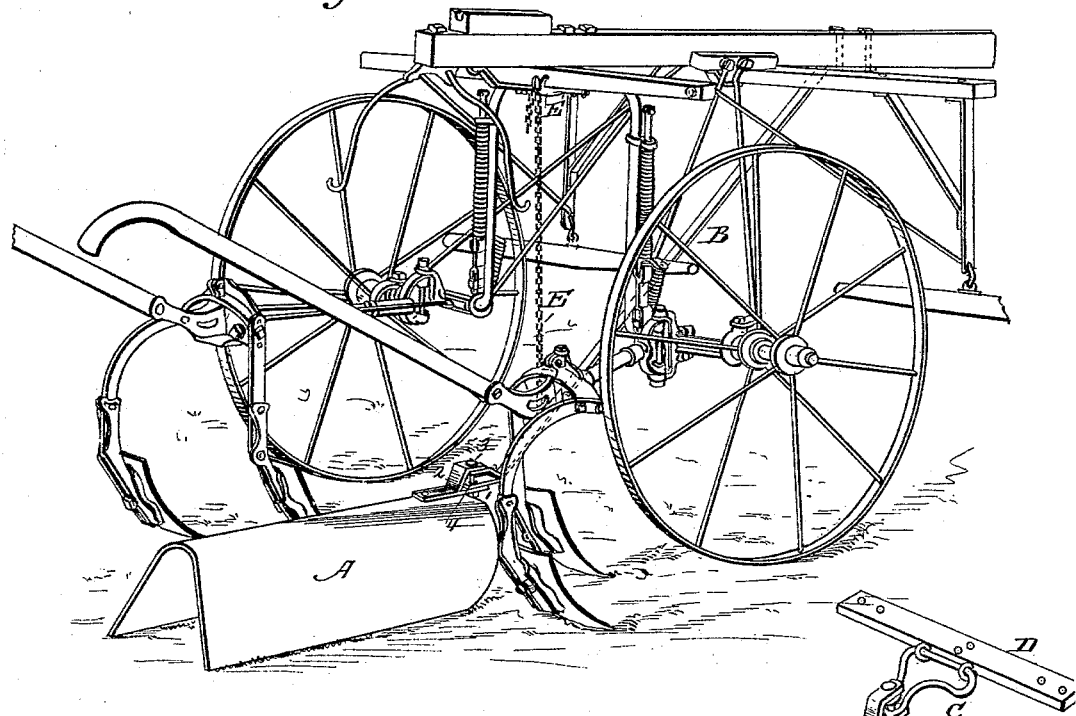
Figure 2:
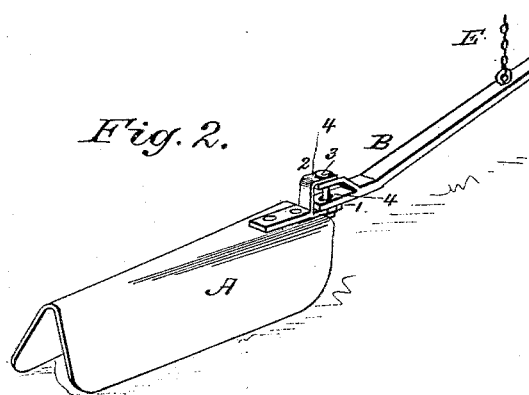

In the drawings, Figure 1 is a perspective view showing the application of the invention, and Fig. 2 is a detail view of the improvement.

The fender proper or shield, A, is formed of a plate of metal bent into a cross sectional shape similar to an inverted U. The forward end of this fender proper, A, is loosely connected with the rear end of the bar B, so such fender may have a vertical and lateral movement on the said bar B.

For convenience of reference we shall herein refer to the bar B as the draft-bar.

In the construction shown a base plate or strap, 1, and an overhanging strap, 2, are connected with the fender, and are perforated to receive the bolt 3, which secures the rear end of the draft-bar between straps 1 and 2, and the bolt-holes 4 through the draft-bar are enlarged sufficiently to permit the desired movement of the fender or shield independent of the draft-bar. It will be noticed that the fender proper converges in cross-section toward its rear end. This construction is important, inasmuch as it serves to prevent the fender being drawn too deeply into the ground, and also serves to compress the soil up to the row. At its forward end the draft-bar is connected by clevis C to the cross bar or tree D, which has central and end bolt-holes to facilitate its attachment to either single or double tongue plow or cultivator frames. The draft-bar is connected by a chain, E, or similar support, with the cultivator-framing, and usually with the arch, such chain being connected with the draft-bar at such point as to sustain the weight of the draft-bar and relieve the fender or shield of such weight.

The device is very simple, and will be found in practice to efficiently protect the plants over which the shield or fender passes.

In connecting the chain E with the frame or arch it is preferred to employ the hook or claw E', secured to the framing and engaged by the links of the chain.

Having thus described our invention, what we claim as new is—

1. A fender, substantially as described, comprising a draft-bar, a fender proper or shield loosely connected with the said draft-bar, and a chain or similar support for sustaining the weight of the draft-bar and relieving the shield of the pressure thereof, substantially as set forth.

2. The combination, with the cultivator or plow frame having a hook or claw, E', of the draft-bar B, loosely connected at its forward end with the said frame at a point in advance of the hook or claw E', the fender proper loosely connected with the rear end of said draft-bar, and the chain E, connected at one end with the draft-bar and adapted to engage and be secured by the hook or claw E', substantially as described, and for the purposes specified.

WALTER McCOY.
JAMES McARTHUR.

Witnesses:
CHAS. PROCTER,
W. C. BABCOCK.